(12) United States Patent
Schilgen et al.

(10) Patent No.: US 11,373,017 B2
(45) Date of Patent: Jun. 28, 2022

(54) COMPUTER-BASED DESIGN SYSTEM FOR AN ELECTRIC DRIVE SYSTEM

(71) Applicant: Lenze Automation GmbH, Aerzen (DE)

(72) Inventors: Tobias Schilgen, Horn-Bad Meinberg (DE); Otmar Foessing, Hameln (DE)

(73) Assignee: Lenze Automation GmbH, Aerzen (DE)

( * ) Notice: Subject to any disclaimer, the term of this patent is extended or adjusted under 35 U.S.C. 154(b) by 711 days.

(21) Appl. No.: 15/529,380

(22) PCT Filed: Nov. 23, 2015

(86) PCT No.: PCT/EP2015/077383
§ 371 (c)(1),
(2) Date: May 24, 2017

(87) PCT Pub. No.: WO2016/083316
PCT Pub. Date: Jun. 2, 2016

(65) Prior Publication Data
US 2017/0262574 A1    Sep. 14, 2017

(30) Foreign Application Priority Data

Nov. 24, 2014 (DE) .................... 10 2014 223 898.6

(51) Int. Cl.
*G06F 30/17* (2020.01)
*G05B 19/18* (2006.01)
(Continued)

(52) U.S. Cl.
CPC ........... *G06F 30/17* (2020.01); *G05B 19/184* (2013.01); *G05B 19/4097* (2013.01);
(Continued)

(58) Field of Classification Search
CPC ............ G06F 17/5086; G06F 2217/06; G05B 19/184; G05B 19/4097; G05B 2219/43062; G05B 2219/43023; G05B 2219/35012
See application file for complete search history.

(56) References Cited

U.S. PATENT DOCUMENTS 2,672,896 A * 3/1954 Shurtliff .................... B27B 7/02
83/878
4,953,483 A * 9/1990 Brower .............. G05B 19/4097
112/470.04
(Continued)

FOREIGN PATENT DOCUMENTS

DE    101 04 795 A1    9/2002
DE    102 21 062 A1    12/2002
ER    1 148 398 A2    10/2001

OTHER PUBLICATIONS

International Search Report (PCT/ISA/210) issued in PCT Application No. PCT/EP2015/077383 dated Feb. 25, 2016 with English translation (7 pages).
(Continued)

*Primary Examiner* — Akash Saxena
(74) *Attorney, Agent, or Firm* — Crowell & Moring LLP

(57) ABSTRACT

A computer-based design system for an electric drive system includes: a cam editor having a graphical user interface, wherein the graphical user interface sets values of parameters of a motion profile of the electric drive system on the basis of user inputs, a limit value memory, which stores limit
(Continued)

values of the motion profile, and a limit value monitoring device, which monitors whether a value of a parameter inputted by a user input causes one or more of the stored limit values to be violated by the resulting motion profile and, in the case that one or more of the stored limit values are violated by the resulting motion profile, to adjust the inputted value of the parameter to such a value of the parameter that none of the stored limit values are violated by the resulting motion profile.

3 Claims, 3 Drawing Sheets

(51) Int. Cl.
*G05B 19/4097* (2006.01)
*G06F 111/04* (2020.01)
*G05B 19/418* (2006.01)
*G05B 19/42* (2006.01)
*G05B 19/427* (2006.01)

(52) U.S. Cl.
CPC ........ *G05B 19/41885* (2013.01); *G05B 19/42* (2013.01); *G05B 19/427* (2013.01); *G05B 2219/35012* (2013.01); *G05B 2219/43023* (2013.01); *G05B 2219/43062* (2013.01); *G06F 2111/04* (2020.01)

(56) References Cited

U.S. PATENT DOCUMENTS

| | | | | |
|---|---|---|---|---|
| 5,457,370 | A * | 10/1995 | Edwards | G05B 19/4093 |
| | | | | 348/E5.022 |
| 6,076,091 | A * | 6/2000 | Fohn | G06F 16/954 |
| | | | | 707/948 |
| 7,438,192 | B1 * | 10/2008 | Kohler | B07C 5/3404 |
| | | | | 209/523 |
| 10,386,810 | B2 * | 8/2019 | Kram | G05B 19/19 |
| 10,469,016 | B1 * | 11/2019 | Fast | H02P 23/16 |
| 2002/0022905 | A1 * | 2/2002 | Erlanoen | G05B 19/416 |
| | | | | 700/181 |
| 2002/0133244 | A1 | 9/2002 | Schroder et al. | |
| 2008/0188976 | A1 * | 8/2008 | Korajda | G05B 19/416 |
| | | | | 700/186 |
| 2016/0098038 | A1 * | 4/2016 | Maturana | G05B 19/41885 |
| | | | | 703/20 |
| 2017/0262574 | A1 * | 9/2017 | Schilgen | G05B 19/184 |
| 2019/0086898 | A1 * | 3/2019 | Wenzel | G05B 19/4145 |

OTHER PUBLICATIONS

German-language Written Opinion (PCT/ISA/237) issued in PCT Application No. PCT/EP2015/077383 dated Feb. 25, 2016 with English translation (32 pages).

Storz, "Interaktive Auslegung von Kurvenscheibentrieben", Apr. 16, 2008, pp. 1-70, XP055250277.

"Kurvenscheibe", Sew-Eurodrive, May 2004 (sixty-eight (68) pages total).

* cited by examiner

COMPUTER-BASED DESIGN SYSTEM FOR AN ELECTRIC DRIVE SYSTEM

BACKGROUND AND SUMMARY OF THE INVENTION

The present invention relates to a computer-based design system for an electric drive system.

The present invention addresses the problem of providing a computer-based design system for an electric drive system that ensures the safest possible operation of the electric drive system.

The present invention solves this problem through a computer-based design system for an electric drive system, comprising a cam editor having a graphical user interface, wherein the graphical user interface is designed to set values of parameters of a motion profile of the electric drive system on the basis of user inputs; a limit value memory, which is designed to store limit values of the motion profile; and a limit value monitoring device, which is designed to monitor whether a value of a parameter inputted by means of a user input causes one or more of the stored limit values to be violated by the resulting motion profile and, in the case that one or more of the stored limit values are violated by the resulting motion profile, to adjust the inputted value of the parameter to such a value of the parameter that none of the stored limit values are violated by the resulting motion profile.

The computer-based design system is used as a design tool for electric drive systems by means of which, for example, motion profiles of the electric drive systems can be designed.

The design system has a cam editor having a graphical user interface. Regarding the basic function of cam editors with graphical user interfaces, reference should be made to the relevant literature.

The graphical user interface of the cam editor is designed to set values of parameters of a motion profile (motion profile-characterizing parameters) of the electric drive system on the basis of user inputs. The user inputs may be made by means of a conventional mouse and/or by means of a keyboard. For example, the motion profile may be altered with respect to the shape, height, extension, or the like thereof by means of the mouse, wherein in this case the shape, height, extension, and the like form the parameters. The motion profile may also be called a motion path, motion curve, or curve track.

The design system furthermore comprises a limit value memory that is designed to store predeterminable limit values of the motion profile, which may be conditioned, in particular, by physical limit values of the electric drive system. The limit value memory may be configured, for example, as a conventional non-volatile memory of a personal computer. The limit values may be predetermined or calculated, for example, by an expert trained specifically for this purpose. The limit values may define permissible or physically possible courses of the motion profile. In other words, the limit values define a possible adjustment range of the parameters of the motion profile, wherein typically a known mathematical relationship—which models physical properties of the electric drive system—exists between the limit values and the possible parameters of the motion profile.

The design system furthermore comprises a limit value monitoring device that is designed to monitor whether a value of a parameter inputted by means of a user input would cause one or more of the stored limit values to be violated by the motion profile that results as a function of the inputted value of the parameter, by, for example, exceeding or falling below the stored limit values.

If one or more of the stored limit values would be violated by the resulting motion profile, then the limit value monitoring device automatically adapts the inputted value of the parameter to such a value of the parameter that none of the stored limit values is violated by the motion profile that results as a function of the adapted value of the parameter.

If none of the saved limit values is violated by the motion profile that results as a function of the inputted value of the parameter, the settings are left unchanged.

The limit value monitoring device may be embodied, for example, as a CPU and related software of a personal computer.

The design system or design tool according to the present invention is used to develop a motion profile, in particular, for a cam. According to the present invention, predetermined drive system-specific physical limit values have already been monitored while the motion profile is being edited in the cam editor, and edited parameters are optionally limited to those values that arise from the predetermined limit values.

For this purpose, extreme value analyses (for example, for calculating limit values in the form of the maximum acceleration (or a magnitude of maximum acceleration), the maximum speed, the maximum jolt, or the like) that lead to a correspondingly restrictive behavior of the cam editor may be carried out in the mathematical curve model of the motion profile by means of the limit value monitoring device, so that the user cannot perform any adjustments that result in exceeding the limit or extreme values.

The cam editor may subdivide the motion profile or the curve track into individual segments. In every segment, the user can determine a function type of an underlying equation of motion (e.g., a polynomial of degree five, or a sine function) as a parameter of the motion profile, and define the (segment) margin values of the equation of motion as further parameters of the motion profile. Margin values are those function values that are to achieve the motion profile or the curve track on the left or right margin of a segment. Thus, for example, the y-value, the speed value, and the acceleration value of a respective margin value are predetermined as parameters of the motion profile. The motion profile or the curve shape within a segment is thus clearly defined by the margin values thereof and by the function type thereof.

If parameters of a curve segment are modified by the user in the cam editor, then the extreme values of the curve within the edited segment necessarily also change as well. During the editing process, the value desired by the user is automatically checked by means of the limit value monitoring device before the adjustment is applied. If, for example, adjusting a parameter in the form of the speed value of a right margin value of a curve segment causes the maximum position value within the segment to leave a limit value in the form of the defined travel range of the motion profile, then the value specified by the user is not applied.

To make it easier for the user to approach a permissible limit value of a motion profile, for example, it is possible, for example, to automatically determine which maximum value for the speed margin value only just allows a shape of the function within the defined travel range. In other words, for example, the maximum of the curve function is positioned exactly at the maximum of the allowed travel range, and the speed margin value is correspondingly corrected by the system.

If the user graphically adjusts the speed margin value of a segment, the curve editor is configured so that the motion profile visualized by means of the cam editor abuts against the limits defined by means of the limit values, and cannot be moved or "bent" therebeyond. Thus, the shape of the motion profile remains at all times in the target region defined by means of the limit values. This makes it easier for the user to adjust the motion profile and avoids unwanted operating conditions of electric drive system as soon as in the design phase.

What is described above also likewise applies for other parameters, e.g., in the form of adjustable margin values. When a parameter in the form of margin value (whether it be an x- or y-position, speed, acceleration, or jolt) is being adjusted, there can, in principle, be verification of whether there is compliance with the extreme values of the motion profile or the associated function equation and derivatives thereof that are defined by means of the limit values. If a resulting or calculated extreme value violates limit values, then that optimized parameter value that comes closest to the user input is sought.

Examples of possible limit values include: Compliance with the travel range in the x- and y-direction (=verification of the extreme values of the path functions) and compliance with speed and acceleration limit values that have been predetermined from the concrete physical drive (=verification of the extreme values of the speed and acceleration functions).

In addition to the isolated individual segment view, there may also be an overall view of the motion profile or of the curve track. It is possible that adjustment of a parameter or margin value in one segment may also affect the adjacent segment. This influence may, in extreme cases, continue in a chain reaction over the entire curve track. This case, too, is checked by the limit value monitoring device, so that the overall curve shape of the motion profile stays at all times within the predetermined limit values.

The described chain reaction arises because the user may link the parameter or margin value adjustment of one curve segment to the value of the neighboring segment. Thus, a thoroughly continuous curve is automatically achieved. This means that, for example, the right speed margin value of a segment is automatically equated with the left speed margin value of the right neighboring segment. Thus, changing a segment margin value can bring about a change in the curve shape in the neighboring segment. In this case, acceptance of a user's set value must be preceded by verification of whether all of the dependent segments also do not exceed the defined limit values thereof.

Exceedance of limit values over the entire curve shape is prevented according to the present invention. If, for example, the travel range is to be widened, the user can, at any time, adjust the limit values in the form of the travel range definition for the motion profile. There is also then verification that the curve remains at all times in the defined range. Thus, the user is, for example, forced to first reduce the curve extension in the vertical direction before being able to reduce the vertical maximum extension of the travel range.

The adjustable parameters of the motion profile may be or include: Support points of the motion profile, and/or coordinates of the support points of the motion profile, and/or a slope of the motion profile (at any position of the motion profile), and/or a curve shape of the motion profile, and/or a travel range of the motion profile, and/or segments of the motion profile, and/or segment borders of the motion profile (i.e., segment margin values), and/or an acceleration of the motion profile (at any position of the motion profile), and/or a jolt of the motion profile (at any position of the motion profile), and/or types of segments of the motion profile.

The limit values may define or be a maximum speed of the motion profile, a maximum acceleration of the motion profile, or a maximum amount of acceleration of the motion profile, a maximum travel range, and/or a maximum jolt of the motion profile.

The present invention furthermore relates to a computer-based design system for an electric drive system having a cam editor with a graphical user interface, wherein the graphical user interface is designed to set values of parameters of a motion profile of the electric drive system on the basis of user inputs. The cam editor is designed to provide user inputs by means of which parameters (in particular, in the form of single or multiple segments of the motion profile) that have been selected previously—e.g., with an associated mouse button—are displaced vertically or horizontally, wherein the cam editor has a first adjustment mode during which previously-selected parameters or segments can only be displaced horizontally, and wherein the cam editor has a second adjustment mode during which the previously-selected parameters or segments can only be displaced vertically.

According to the present invention, vertical and horizontal displacement are carried out in separate operation procedures. Separating into two directional components "horizontal displacement" and "vertical displacement" prevents wrong inputs. The graphical displacement operation can be done without a keyboard input, and is thus user-friendly and easy. The manner of operation unfolds in an almost intuitive manner, i.e., the user ideally does not even need a user manual. He or she discover the manner of operation through simple trial and error—the mouse pointer indicates what the user can do.

The cam editor implements the following control logic:

The segment or a plurality of segments is/are first marked, for example, by clicking on an individual segment or by a range selection over a plurality of segments to be selected, wherein the range selection may take place over a rectangular area that can be extended by means of the mouse in such a manner that all of the segments within the rectangular area are marked.

The selected segment(s) may be displaced vertically as long as it/they is/are displaced between the endpoints with the mouse with the mouse button pressed, wherein only the y-component of the mouse movement is used. In the process, the mouse pointer shows, through a given symbol (for example, vertical arrows), that this action can be carried out when the mouse button provided therefor is pressed.

The selected segment(s) may be displaced horizontally when the mouse button provided therefor is pressed, the mouse pointer is located in the horizontal capture range of an end point, and the mouse pointer is not located in the capture range of at least one vertical segment separator.

The segment sections are represented such that the endpoints are illustrated by vertical lines—the so-called segment separators. If these are touched outside of a curve endpoint, the marked segments may therewith be displaced horizontally. In the process, the mouse pointer shows, through a given symbol (for example, horizontal arrows), that this action can be carried out when the given mouse button is pressed.

Thus, if necessary, the definition of the motion profile can be divided into two phases: in phase 1, the motion sections (segments) are defined and horizontal ranges are set together with the user. In phase 2, the segments can still be changed:

a law of motion is selected, the curve shape within a segment is optimized, etc. Then, however, the horizontal ranges (=segments) of the curve track that have been defined with the customer should not be accidentally displaced.

The present invention furthermore relates to a computer-based design system for an electric drive system having a cam editor with a graphical user interface, wherein the graphical user interface is designed to set values of parameters of a motion profile of the electric drive system on the basis of user inputs. The design system is designed to visualize, in particular, in real time, a motion profile that has actually been executed by the drive system.

This makes it possible to track online the correct execution of the projected motion profile during deployment. The position of a master axis can be graphically represented for this purpose in the cam editor.

This function is typically useful during deployment with slow movement of the master axis or master signal. The question of which curve data is currently in execution can be verified visually.

The online representation according to the present invention can be activated by expanding a ruler function by an additional mode. The ruler may be active, inactive, or in the automatic mode. In the automatic mode, the ruler follows the master position. There is always only one ruler that will be shown at the same time. This yields clarity and comprehensibility for the user.

The design system may be designed in order to visualize deviations of a motion profile projected by means of the design system from a motion profile actually executed by the drive system on the basis of the projected motion profile.

BRIEF DESCRIPTION OF THE DRAWINGS

The present invention shall be described in greater detail below, with reference to the drawings. In the drawings, which are schematic.

DETAILED DESCRIPTION OF THE DRAWINGS

Figure 1:
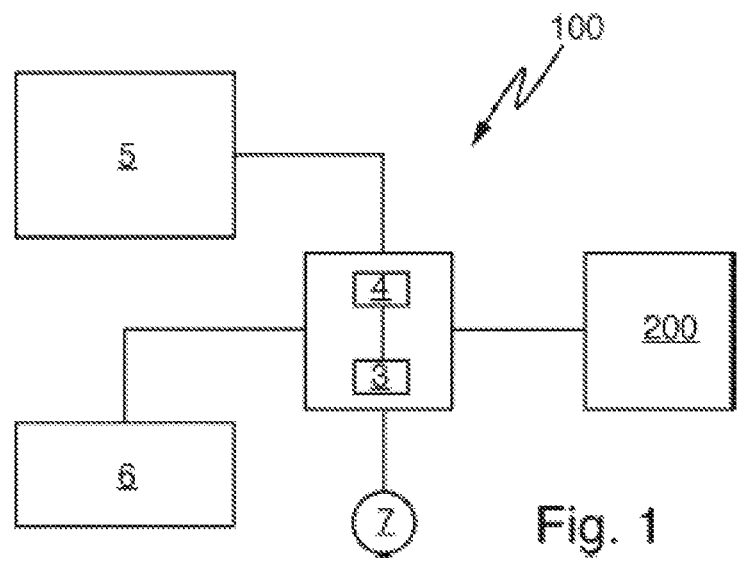
FIG. 1 illustrates a block diagram of a computer-based design system.

FIG. 1 is a highly schematic illustration of a block diagram of a computer-based design system 100 for an electric drive system 200. The design system 100 comprises a screen 5, a non-volatile limit value memory 3, a limit value monitoring device 4, a keyboard 6, and a mouse 7. The limit value memory 3 and the limit value monitoring device 4 may be realized by means of a conventional personal computer, in the hardware and/or software.

Figure 2:
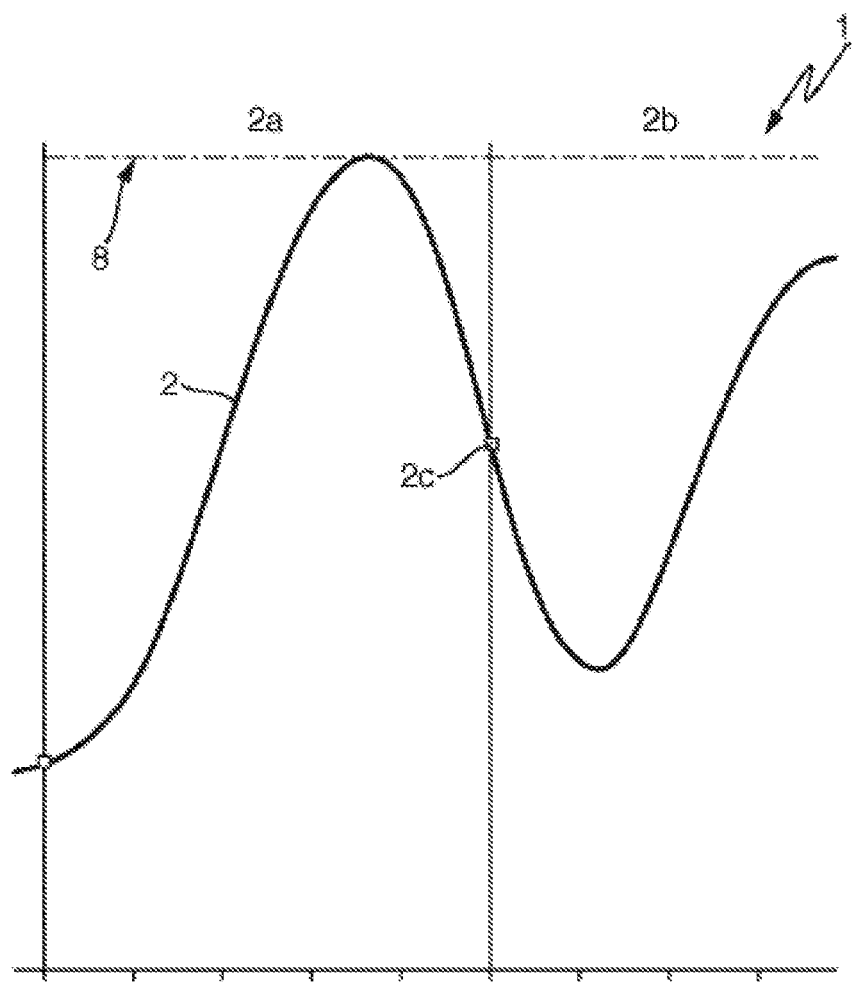
FIG. 2 illustrates a graphical user interface of the design system illustrated in FIG. 1.

FIG. 2 illustrates a graphical user interface 1 of the design system 100 illustrated in FIG. 1, which is represented on the screen 5.

The user interface 1 is part of a cam editor according to the present invention. The graphical user interface 1 is designed to set values of parameters of a motion profile 2 of the electric drive system 200 on the basis of user inputs in the form of mouse operation actions and keyboard inputs.

The x-axis of the motion profile 2 stands for a so-called master axis, and the y-axis stands for a so-called slave axis with the travel range thereof.

The motion profile 2 depicted in FIG. 2 has two adjacent segments 2a and 2b. An adjustable parameter of the motion profile 2 is, for example, a speed at a limit or margin value 2c at the segment border between the segments. Reference is furthermore also made to the relevant literature regarding motion profiles.

When a user increases the speed at the margin value 2c, the curve shape of the motion profile 2 changes as a consequence, wherein a maximum (maximum position value in the y-direction) of the motion profile 2 increases in the segment 2a.

Because, however, a travel range in the y-direction is limited by a limit value in the form of a physically possible travel range 8 of the drive system 200, the speed desired by the user at the margin value 2c, inter alia, is automatically monitored by means of the limit value monitoring device 4 with respect to whether the maximum of the motion profile 2 arising with the change exceeds the limit value in the form of the physically possible travel range 8. Should this be the case, the parameter value specified by the user is not applied. Instead, the maximum value for the speed at the margin value 2c that only just allows for a shape of the motion profile 2 that is within the defined travel range 8 is automatically determined and set (see FIG. 2). In other words, the maximum of the motion profile 2 is positioned exactly at the maximum of the allowed travel range 8, and the speed is correspondingly corrected by the system.

The limit value memory 3 stores a plurality of limit values of the motion profile 2, e.g., the physically possible travel range 8. Other limit values may define or represent a maximum speed, a maximum acceleration, a maximum jolt, and/or segment borders of the motion profile.

Figure 3:
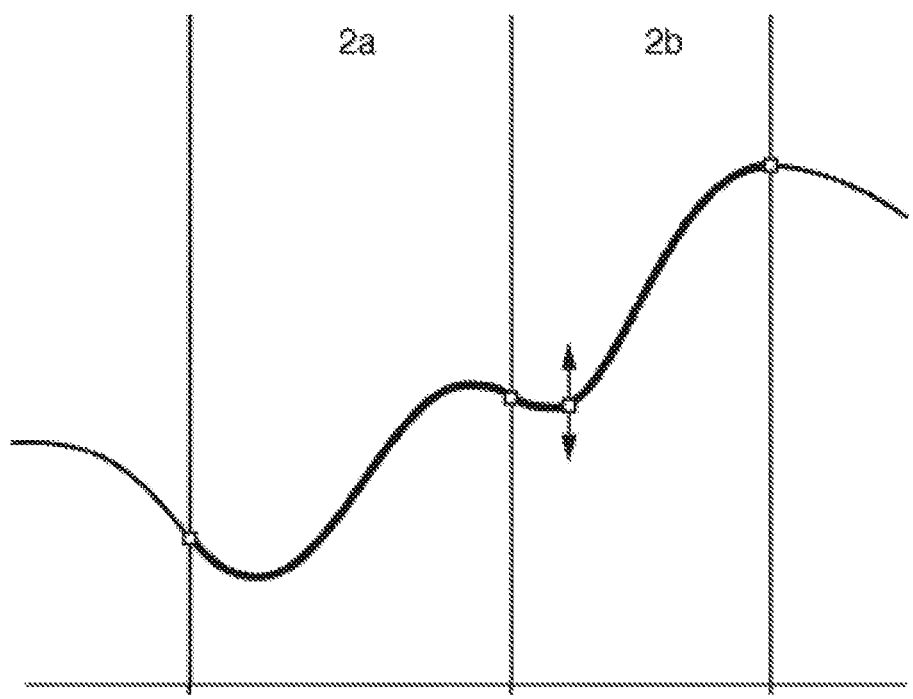
FIG. 3 illustrates the graphical user interface of the design system illustrated in FIG. 1, in a vertical displacement operation of a segment group.

FIG. 3 illustrates the graphical user interface 1 of the design system 100 illustrated in FIG. 1, during a vertical displacement process for a segment group composed of the segments 2a and 2b, which in FIG. 3 have different courses from those in FIG. 2. The displacement of the segment group shall be described hereinbelow. An individual segment is displaced in a corresponding manner.

The segment group is first marked, for example, by clicking on the individual segments 2a and 2b or a range selection thereover. A plurality of segments can be selected by means of a rectangular area that can be extended with the mouse 7 in such a manner that all of the segments of which both horizontal endpoints lie in the area of the rectangle are added to the segment group.

The segment group may be displaced vertically as long as it displaced between the desired endpoints with the mouse with the mouse button pressed, wherein only the y-component of the mouse movement is used (see FIG. 3).

In the displacement process, the mouse pointer indicates, through a given symbol (here, vertical arrows), that the vertical displacement can be carried out when the mouse button provided therefor is pressed.

Figure 4:
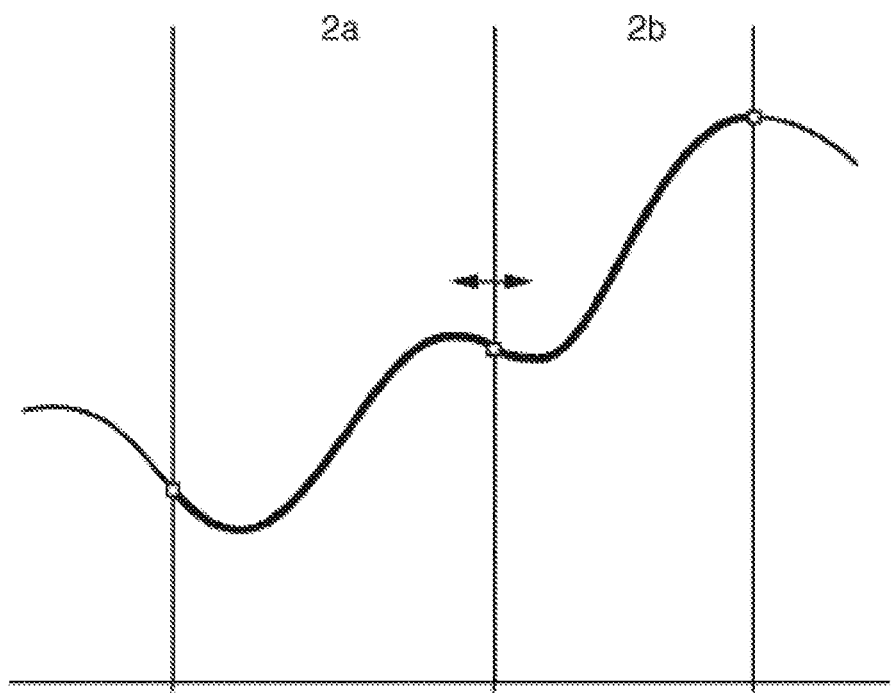
FIG. 4 illustrates the graphical user interface of the design system illustrated in FIG. 1, in a horizontal displacement operation of the segment group.

The segment group may be displaced horizontally when the mouse button provided therefor is pressed, the mouse pointer is located in the horizontal capture range of a segment end point, and the mouse pointer is not in the capture range of at least one vertical segment separator (see FIG. 4). The segments are represented such that the horizontal endpoints thereof are illustrated by vertical lines—the so-called segment separators. If these are "touched" outside of a curve endpoint by means of the mouse 7, the marked segment 2a may therewith be displaced horizontally.

In this horizontal displacement process, the mouse pointer shows, through a given symbol (here, horizontal arrows), that this action can be carried out when the given mouse button is pressed.

Figure 5:
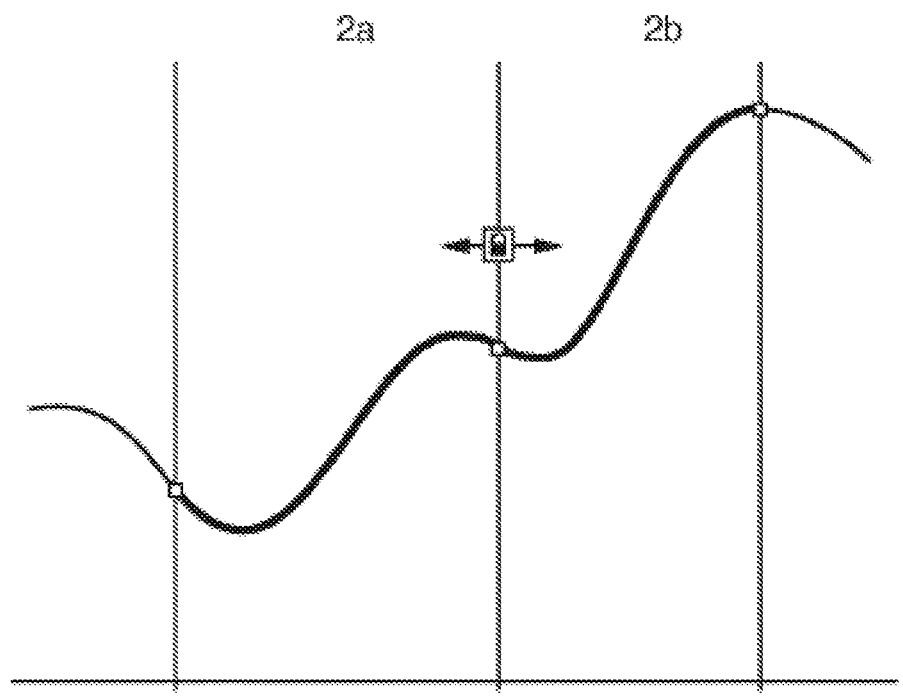
FIG. 5 illustrates the graphical user interface of the design system illustrated in FIG. 1 when the horizontal displacement operation is locked.

In order to avoid unwanted horizontal displacements of the endpoints, these may additionally be locked against horizontal displacement. This may be done globally, for example, by a switch with a lock symbol, but individual locking is also conceivable. The locked state of a segment is indicated to the user by superimposing a lock symbol in the mouse pointer in the situation where the mouse pointer in the unlocked state shows the ability to displace, i.e., for example, when passing over a segment separator with the mouse (see FIG. 5).

Thus, if necessary, the definition of the motion profile can be divided into two phases: in phase 1, first, segments are defined and horizontal ranges are set. In phase 2, the segments can still be changed: a law of motion is selected, the curve shape within a segment is optimized, etc. Then, however, the defined horizontal ranges (=segments) of the motion profile or the curve track should not be accidentally displaced.

This allows for intuitive operation with protection against wrong operation. A keyboard is not necessarily required for the described functions.

Figure 6:
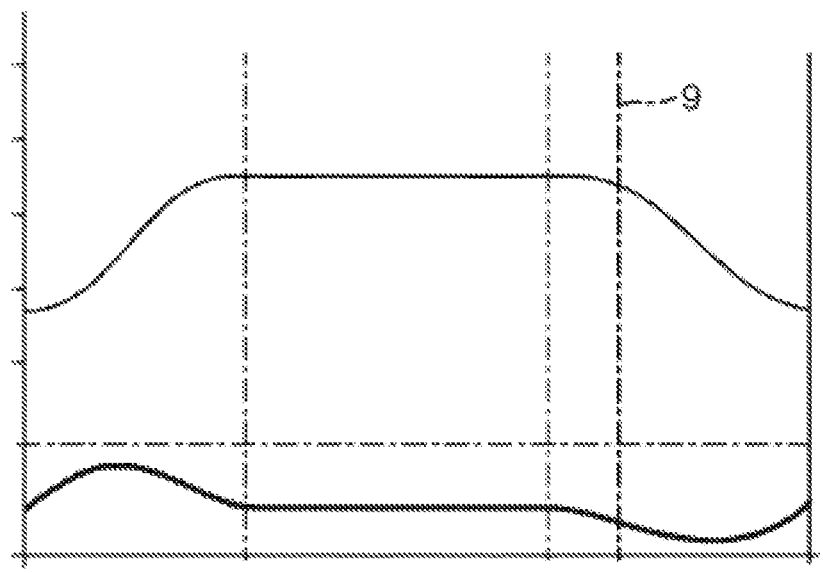
FIG. 6 illustrates the graphical user interface of the design system illustrated in FIG. 1, in an online mode.

FIG. 6 shows the graphical user interface 1 of the design system 100 illustrated in FIG. 1 in a so-called online mode during which the design system 100 has a data link to the drive system 200. The position as a function of the master axis position is depicted above, and the speed as a function of the master axis position is depicted below.

The online mode makes it possible to track the motion profile currently being executed in the drive system 200, by means of a marking 9 that, in the online mode, automatically follows the master axis position (x-axis). The ruler function contained in the editor represents the marking 9. The marking or the ruler 9 follows the master position in the automatic mode, and it is indicated whether the curve being represented in the design system 100 or the represented motion profile also corresponds exactly to the curve/motion profile that is in execution in the drive system.

The online mode is typically useful during deployment with slow movement of the master axis or master signal. It deals with calibration and testing of a machine. The question of which curve data is currently in execution can be verified visually.

The online mode is activated in a manner that is easy for the user to understand and use: the existing ruler function is expanded by an additional mode. The ruler may be active, inactive, or in the automatic mode. In the automatic mode, the ruler follows the master position. There is always only one ruler that will be shown at the same time. This yields clarity and comprehensibility for the user. The on/off switch for the ruler in the toolbar of the editor (upper area of the screen, see 6. Control button from the left with the blue icon in the bottom image) receives an additional 3. Switching state that corresponds to the active automatic mode. This is only selectable if the editor is in the online mode, i.e., if the programming environment is connected to the device.

The invention claimed is:

1. A computer-based design system for an electric drive system, comprising:
a central processing unit that implements a value limit monitoring device and a limit value memory;
a cam editor having a graphical user interface, wherein the graphical user interface sets values of parameters of a motion profile of the electric drive system on the basis of user inputs;
the limit value memory, which stores limit values of the motion profile; and
the limit value monitoring device which monitors whether a value of a parameter inputted by a user input causes one or more of the stored limit values to be violated by the resulting motion profile and, in the case that one or more of the stored limit values are violated by the resulting motion profile, to automatically adjust the inputted value of the parameter to an adapted inputted value of the parameter that comes closest to the inputted value without violating any of the stored limit values by the resulting motion profile,
wherein the design system visualizes deviations of a motion profile projected by the design system from a motion profile executed by the drive system in real time on the basis of the projected motion profile, and
wherein the cam editor provides user inputs by which parameters that have been selected previously are displaced vertically or horizontally, wherein the cam editor has a first adjustment mode during which previously-selected parameters can only be displaced horizontally, and wherein the cam editor has a second adjustment mode during which the previously-selected parameters can only be displaced vertically.

2. The design system according to claim 1, wherein the parameters of the motion profile comprise one of more of: support points of the motion profile, coordinates of the support points of the motion profile, a slope of the motion profile, a curve shape of the motion profile, a travel range of the motion profile, segments of the motion profile, segment borders of the motion profile, speeds at segment limits of the motion profile, segment margin values of the motion profile, an acceleration of the motion profile, a jolt of the motion profile, and types of segments of the motion profile.

3. The design system according to claim 1, wherein the limit values define one or more of: a maximum speed, a maximum acceleration, a maximum jolt, a maximum travel range, and segment borders of the motion profile.

* * * * *